(12) United States Patent
Schmid et al.

(10) Patent No.: US 7,852,067 B2
(45) Date of Patent: Dec. 14, 2010

(54) SHIELDED POSITION SENSOR FOR TRANSLATIONALLY MOVING PARTS

(75) Inventors: Max Schmid, Wangs (CH); Fouad Mahdi, Bonaduz (CH)

(73) Assignee: Pilz Auslandsbeteiligungen GmbH, Ostfildern (DE)

( * ) Notice: Subject to any disclaimer, the term of this patent is extended or adjusted under 35 U.S.C. 154(b) by 430 days.

(21) Appl. No.: 11/806,414

(22) Filed: May 31, 2007

(65) Prior Publication Data

US 2007/0279048 A1   Dec. 6, 2007

(30) Foreign Application Priority Data

Jun. 1, 2006   (CH) .................... 0882/06

(51) Int. Cl.
*G01B 7/14* (2006.01)
(52) U.S. Cl. ................................. 324/207.24
(58) Field of Classification Search ........ None
See application file for complete search history.

(56) References Cited

U.S. PATENT DOCUMENTS 3,993,885 A * 11/1976 Kominami et al. .......... 219/622
4,755,636 A *  7/1988 Akio ........................ 200/82 E
4,793,241 A * 12/1988 Mano et al. .................. 92/5 R
4,967,792 A * 11/1990 Magee ....................... 137/552

FOREIGN PATENT DOCUMENTS

FR           2370907       *   7/1978

* cited by examiner

*Primary Examiner*—Jay M Patidar
(74) *Attorney, Agent, or Firm*—Buchanan Ingersoll & Rooney PC

(57) ABSTRACT

A sensor is disclosed for monitoring a part which can move translationally relative to a sensor with reference to its position on the axis of motion. This part is for example a piston in a cylinder which is equipped with a sensor. The sensor can be actuated by means of a magnet which is oriented in the direction of motion with respect to the north and south pole and which is located on the movable part. The sensor has three reed contacts which are aligned in parallel and of which the first and the second reed contact are located in one plane and parallel next to one another with their lengthwise axes, by which they can be actuated almost at the same time by the magnetic field of the magnet which is located on the movable part. The third reed contact is located at a distance to the plane of the first and the second reed contact. This sensor with the first two reed contacts is mounted facing the actuating magnet. This arrangement has the advantage that an external magnetic field always actuated the third reed contact as well, if it can actuate the first two reed contacts. Then the sensor indicates an error report or an unsafe position, but never a safe position of the movable part.

14 Claims, 4 Drawing Sheets

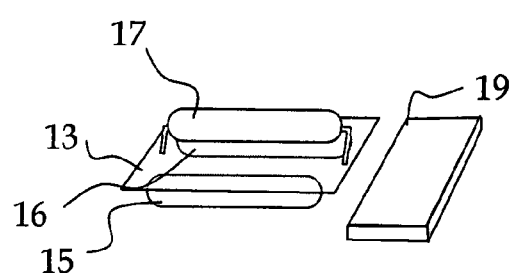
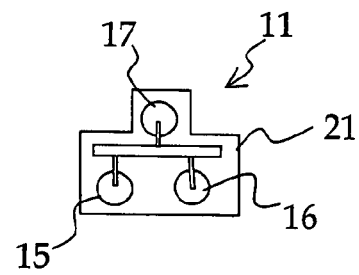
Fig. 1　　　　Fig. 2
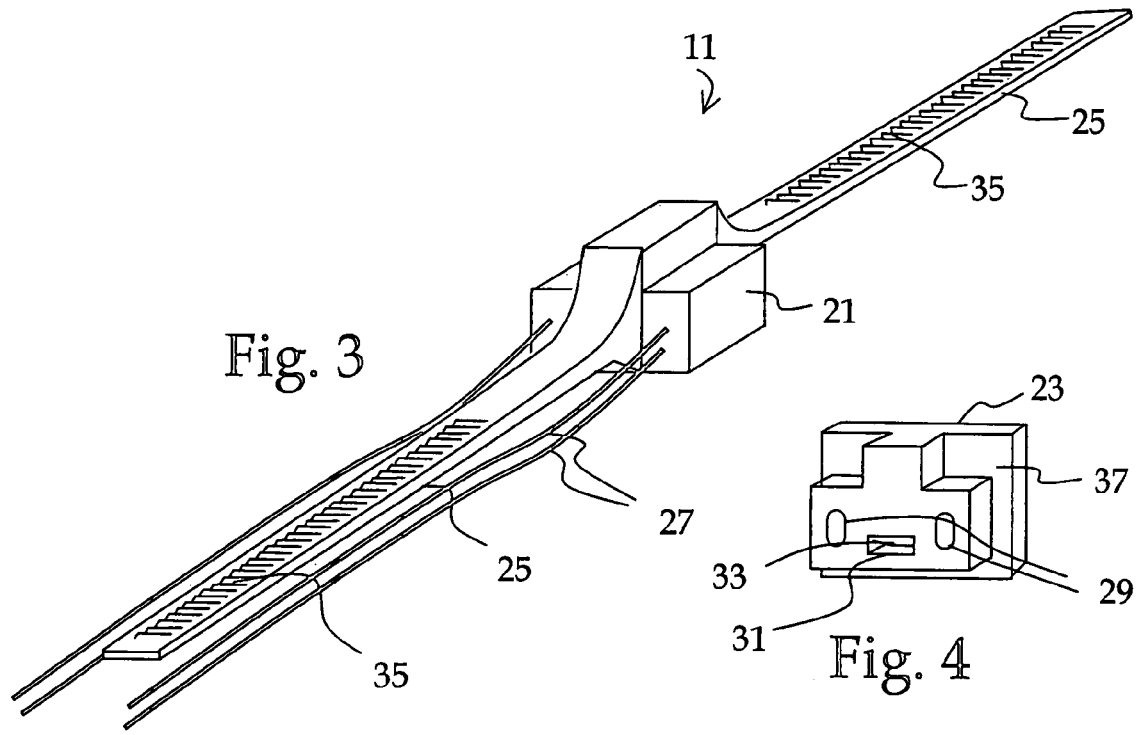
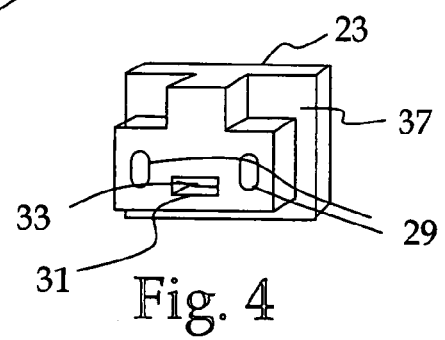
Fig. 3
Fig. 4

SHIELDED POSITION SENSOR FOR TRANSLATIONALLY MOVING PARTS

RELATED APPLICATIONS

This application claims priority under 35 U.S.C. §119 to Swiss Application 00882/06 filed in Switzerland on Jun. 1, 2006, the entire contents of which are hereby incorporated by reference in their entireties.

TECHNICAL FIELD

The disclosure relates to a sensor for monitoring a part which can move translationally relative to a sensor with reference to its position on the axis of motion, and to a cylinder with such a sensor for monitoring the position of the piston with respect to its axis of motion. The disclosure relates especially to a safety position sensor for a pneumatic or hydraulic cylinder and such a cylinder with the position sensor.

BACKGROUND INFORMATION

Monitoring the position of a piston which is provided with a magnet using a reed contact which can be influenced by the magnet is known. This is often achieved with magnetic rings around the piston and one or two reed switches which act in parallel on the cylinder. The cylinder consists of nonmagnetic material for this purpose.

These reed contacts can moreover be caused to close by magnets attached from the outside when they should be open due to the position of the cylinder. This should be avoided for safety reasons. Moreover unintended movement of the sensor along the axis of motion of the cylinder should be prevented to allow calibration of the position of the sensor.

SUMMARY

A safety sensor is disclosed which indicates a safe position of a movable part only when this part is in the safe position. It should not be able to be influenced by external magnet fields to indicate a safe position of the cylinder when it is in an unsafe position. Thereby, the sensor can be positioned and safe fixing of the sensor is possible for example on a cylinder in this position using technically simple means.

A sensor for monitoring a part which can move translationally relative to a sensor with reference to its position on the axis of motion can be actuated by means of a magnet which is oriented in the direction of motion with respect to the north and south pole and which is located on the movable part. An exemplary embodiment has three reed contacts which are arranged in parallel and of which the first and the second reed contact are located in one plane. They are located parallel next to one another with their lengthwise axes. By this arrangement they can be actuated almost at the same time by the magnetic field of the magnet which is located on the movable part. The third reed contact is located at a distance to the plane of the first and the second reed contact. This sensor, with the third reed contact located at a greater distance to the actuating magnet than the other two reed contacts, is safe against manipulation by external magnetic fields. An external magnetic field applied from the outside will always first actuate the third reed switch which is nearer the magnet which has been applied from outside. It is almost impossible not to actuate the third reed contact located near the first two reed contacts when the first and second reed contact are actuated with an outside magnetic field. In order to actuate the first two reed contacts without actuating the third reed contact, it is necessary to achieve a drop in the magnetic field as large as possible between the position of the first two and the position of the third reed contact. This is essentially only possible when the field magnet is near the first two reed contacts, and therefore at the position which is already intended for the field magnet. Moreover fine tuning of the sensitivities of the reed contacts and of the strength of the magnetic field which has been generated by the magnet on the movable part is necessary.

This sensor is especially suited to detecting the position of a piston in a cylinder. In this connection the sensor is located on the cylinder which consists of nonmagnetic material, for example aluminum, and the piston bears a magnet, e.g., a magnetic ring around the piston.

The third reed contact is advantageously at most as sensitive as the two identically switching reed contacts which are arranged in parallel, so that it does not respond only at a stronger magnetic field than this. Thus the distance to the field magnet is the deciding factor.

In order to make the range for a sensor signal more precise and to make the boundary region between the position of the magnet which excites the sensor signal and the position which does not excite a sensor signal as short as possible, on one end of the two identically switching reed contacts, e.g., on both ends of the reed contacts, the sensor is provided with a shield, especially an iron part. This shield distorts the magnetic field of the field magnet so that the magnetic field is deflected by the material of the shield away from the region of the reed contacts. Starting from a certain position of the magnet the magnetic field jumps with one pole out of the shield and with the other pole into the shield, i.e. when mainly the field lines in the north have been deformed by the shield until then and the field lines in the south have remained essentially undeformed, the deformation jumps suddenly onto the field lines of the south pole, while the field lines of the north pole remain largely undeformed. In this way a more distinct signal is achieved.

This jumping can also be achieved with bilateral shielding, all the field lines being deformed. The field lines which have been acquired by the first shield are however suddenly acquired by the other shield, the first shield immediately acquiring the field lines of the other pole.

The bilateral shielding has especially the advantage that backward installation of the sensor is precluded. Alternatively there can be unambiguous identification of the sensor and the position of the shield.

For simple installation of the sensors which cannot be moved by vibrations and unintentional manipulation, the sensor is provided on opposing ends with a mounting tail. This mounting tail prevents movement of the sensor away from the end of the tail so that with two opposing mounting tails movement in both directions is prevented.

In order to easily attach the mounting tails there are advantageously two catch heads. The mounting tail is provided with teeth and the catch head is provided with a catch mechanism which engages the teeth. The teeth and the catch mechanism in interaction allow the catch heads to be slipped on, but prevent the catch head from being pulled off once it has been slipped on. These teeth and catch mechanisms are known from cable links.

It can be provided that the catch mechanism can be released from active connection with the mounting tail by means of a tool.

Simple and reliably immovable positioning of the sensor for monitoring a part which can move translationally relative to the sensor with reference to its position on the axis of motion which can be actuated by means of a magnet located on the movable part can be achieved in that the sensor is provided on the opposing ends with a mounting tail and that there are two catch heads. Each mounting tail is provided with teeth and each catch head is provided with a catch mechanism which engages the teeth, which in interaction allow the catch heads to be slipped on the mounting tail, but prevent the catch heads from being pulled off once a catch head has been slipped on. The catch heads have a stop which after mounting of the sensor, for example on a cylinder, presses against the stop surface of the cylinder so that the sensor is prevented by one mounting tail from moving in one direction, and with the other mounting tail from moving in the opposite direction.

For fine calibration, a stop of the catch heads can be connected via a thread to the catch mechanism of the catch heads, which thread extends in the lengthwise direction of the mounting tail. For the sake of safety the stops can be captively connected to the catch mechanism. Twisting of the stops around the thread axis should not be able to lead to release of the catch head from the mounting tail.

Alternatively to the version with two mounting tails on the sensor and two catch heads which interact with them, the sensor can also be made with two catch mechanisms which engage oppositely, and fixing of the sensor can take place by insertion of the mounting tails which are provided with stops and teeth. They are inserted into the two catch mechanisms from both sides. Advantageously the mounting tails are made such that they have room next to one another in a groove which is made for example on the cylinder and can therefore overlap in the lengthwise direction.

Formulated somewhat more generally, the sensor is characterized by a fastening means which is made interacting with the sensor or connected to the latter. It prevents shifting of the sensor, especially in the direction of motion of the piston. The fastening means connects the sensor via, e.g., a detachable form-fit to a carrier for the sensor. The carrier is mainly the wall of the cylinder. There can be a spring means for maintaining the form-fit. The spring means are captive and reliably maintain the form-fit, for example between the mounting tail and catch lip, or between a tooth and a recess which has been pressed into the surface of the carrier.

The sensor can be provided with a fastening means which has at least one tooth which can be pressed into the surface of a groove which holds the sensor. A depression for the form-fit with the tooth can be achieved by this pressing in. But alternatively there can also be for example edging in the surface of the carrier which has a series of recesses. In this case the tooth engages one of these recesses of the edging.

The fastening means advantageously encompasses the sensor body. In this way it is likewise positively connected to the fastening means.

The fastening means can thus be a spring element which has been detached from the sensor. This has the advantage that the fastening means can be produced in one piece from for example a spring steel strip which is made to surround the sensor body. Advantageously there are at least two teeth which can be caused to engage the surface of the groove in the carrier. On this spring element moreover a flange 69 is advantageously formed and fits into the undercut of a groove which has been undercut in a T-shape. Thus the spring element simply together with the sensor can be pushed in the lengthwise direction into and out of the groove.

The disclosure also relates to a cylinder with a piston in which on the piston there is a magnet which is pointed with the polarity in the direction of motion of the piston. On the cylinder there is a sensor for monitoring the position of the piston in the cylinder. The sensor can make the monitoring of the piston position reliable. It ensures safety in that the two reed contacts have to respond at the same time to the magnetic field of the magnet and in that the third reed contact should not respond. The third reed contact due to its greater distance from the magnet and piston is in a closer position to the external magnetic field acting from the outside. It therefore always switches before the two inner reed contacts when an external magnetic field which is acting from the outside is strong enough to influence the sensor. Since the third reed contact opens when the other two close (or vice versa), a safe position of the piston cannot be simulated by the external magnetic field.

On the cylinder a groove is advantageously formed in which the sensor is movably supported in the direction of motion of the piston. The sensor can be inserted into this groove from the outside and can be moved into the desired position along the direction of displacement which is possible in it.

The sensor is advantageously made as a cylindrical part (but a non-axially symmetrical and therefore non-circularly cylindrical part, but can be as a right parallelepiped which is made symmetrical to the mirror plane), with a cylinder axis which is parallel to the lengthwise direction of the reed contacts.

Due to the deviation from axial symmetry the cross section of the sensor perpendicular to its cylinder axis is made such that the sensor can be pushed into the groove in the cylinder only in a single rotary position with respect to its cylinder axis. Thus insertion of the cylinder in an incorrectly aligned position can be made impossible. Alternatively (or additionally) marking of the sensor is possible which makes incorrect insertion of the sensor into the groove obviously detectable.

In the known manner a magnetic ring is formed around the piston so that the position always has the same effect on the sensor regardless of its rotary position around the piston axis.

BRIEF DESCRIPTION OF THE DRAWINGS

The invention is detailed below using the examples shown in the figures.

FIG. 1 shows in a perspective and schematic the basic module of an exemplary sensor, FIG. 2 shows a view of a sensor which has been potted in a sensor body, FIG. 3 shows a perspective sketch of a first exemplary embodiment of the sensor with two mounting tails, FIG. 4 shows a perspective sketch of a catch head for locking interaction with a mounting tail.

DETAILED DESCRIPTION

Figures 5, 6:
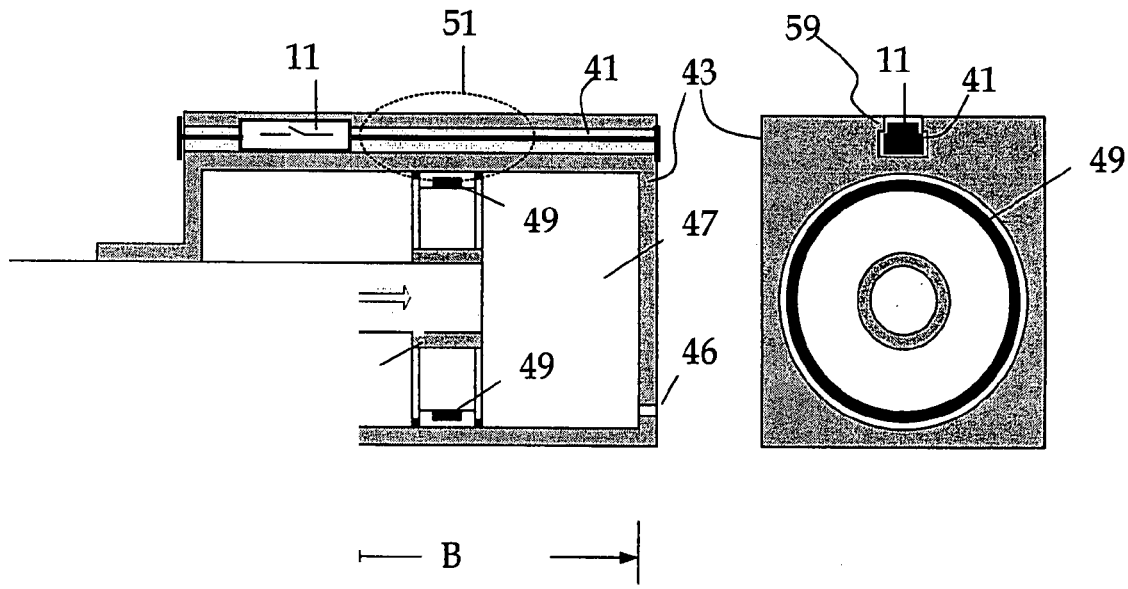
FIG. 5 shows a lengthwise section through a cylinder with an exemplary sensor and a field magnet on the piston, in which the piston is in an unsafe position.
FIG. 6 shows a cross section through the cylinder as shown in FIG. 5.

The heart of the sensor 11 shown in FIG. 1 is comprised of a printed board 13 and the first two reed contacts 15, 16 and a third reed contact 17. The first two reed contacts 15 and 16 are make contacts which are arranged in parallel. The third reed contact 17 is connected in series to the first reed contact 15 and is a break contact.

The first two reed contacts are located next to one another underneath the printed board 13 in a common plane such that the terminal points for the reed contacts are arranged in a rectangle. The third reed contact 17 is located above the printed board 13 and parallel to it. Its terminal points lie on the two sides of the rectangle formed by the terminal points of the first two reed contacts 15, 16.

In the plane of the first two reed contacts 15 and 16 there is a metal rod as magnetic shielding 19. The three-dimensional execution of the metal rod in the example is aligned perpendicular to the lengthwise direction of the reed contacts 15 and 16. The width of the metal rod is pointed in the lengthwise direction of the reed contacts 15 and 16. In this way the shielding is located as much as possible at a distance to the third reed contact and effectively shields the first two reed contacts.

These aforementioned parts are potted in the plastic sensor body 21 which is shown in FIG. 2. This sensor body 21 has a T-shaped cross section. Within the upright of the T is the third reed contact 17, in the crosspiece of the T are the printed board and the first two reed contacts 15 and 16, and if present, the shielding 19. The sensor body 21 is matched in its shape to the receiving means which is designed to hold the sensor. The illustrated cylindrical shape with the T-shaped cross section is suited to arranging the sensor to be able to move lengthwise in a groove which is made undercut in a T shape.

The sensor 11 which is shown in FIG. 3 with two of the catch heads 23 shown in FIG. 4 on the two mounting tails 25 can be fixed in different positions in this groove which has been undercut in a T shape. The sensor 11 on the central sensor body 21 has one mounting tail 25 each on the opposing T-shaped end sides which lie perpendicular to the lengthwise direction of the reed contacts. They are cast in one piece with the sensor body 21. Connecting cables 27 for the sensor emerge from one of these end sides. These cables can also emerge on the two end sides, in contrast to the figures. The connecting cables 27 can be routed through the openings 29 in the catch head 23.

On the catch head 23 a catch opening 31 for routing through the mounting tail 25 is formed. In this catch opening 21 there is a catch lip 33 which can engage the teeth 35 on the mounting tails 25. On the catch head a stop surface 37 is formed which can interact with one end side of the wall which forms the groove.

In FIG. 5 this sensor 11 is located in a groove 41 in the wall of a cylinder 43. The piston 45 is supported to be able to move linearly in the cylinder space 47. It can be pushed back and forth by air, hydraulic fluid, or another medium, or it moves this medium by its position change which is caused for example by a motor. For entry and exit of the medium in the piston wall there are openings 46. This motion of the piston is transferred with a plunger 48 from the motor to the piston or from the piston to a tool, for example. On the periphery of the piston 45 there is a ring magnet 49. A field line 51 represents the local magnetic field of the magnet 49 schematically simplified.

Figure 7:
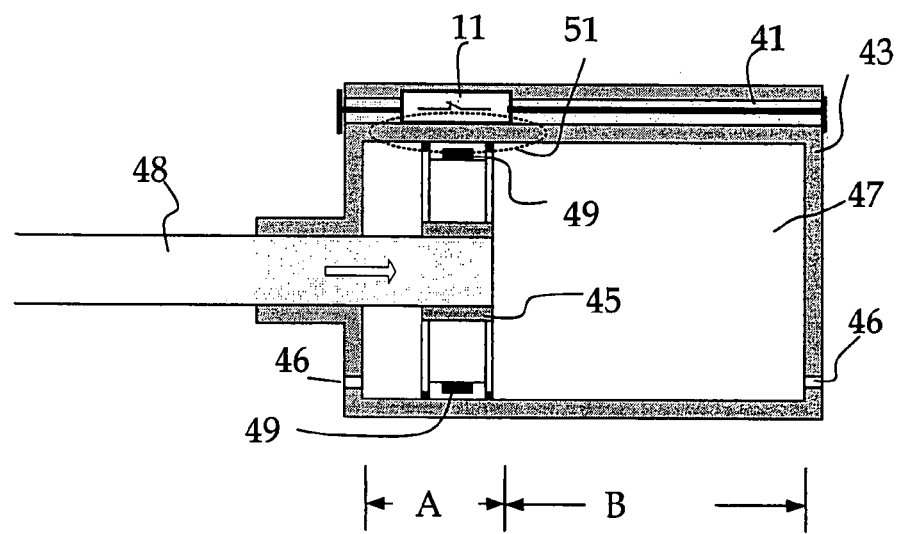
FIG. 7 shows a lengthwise section through the cylinder in which the piston is in a safe position.

In FIG. 5 the piston is in the unsafe region B. In FIG. 7 the piston 45 is shown in the safe region A. When the piston 45 is in the unsafe region B, the magnetic field of the magnet 49 is not strong enough to switch the reed contacts in the sensor 11. Only in the position in which the field lines extend through the reed contacts can the magnet switch them. The first two reed contacts 15 and 16 are nearer the magnet. They therefore shield the outer, third reed contact in addition. The magnet lines extend, as soon as they reach the region of the contact elements of the reed switch, concentrated through them and thus excite the force which closes the contact in them.

Figure 8:
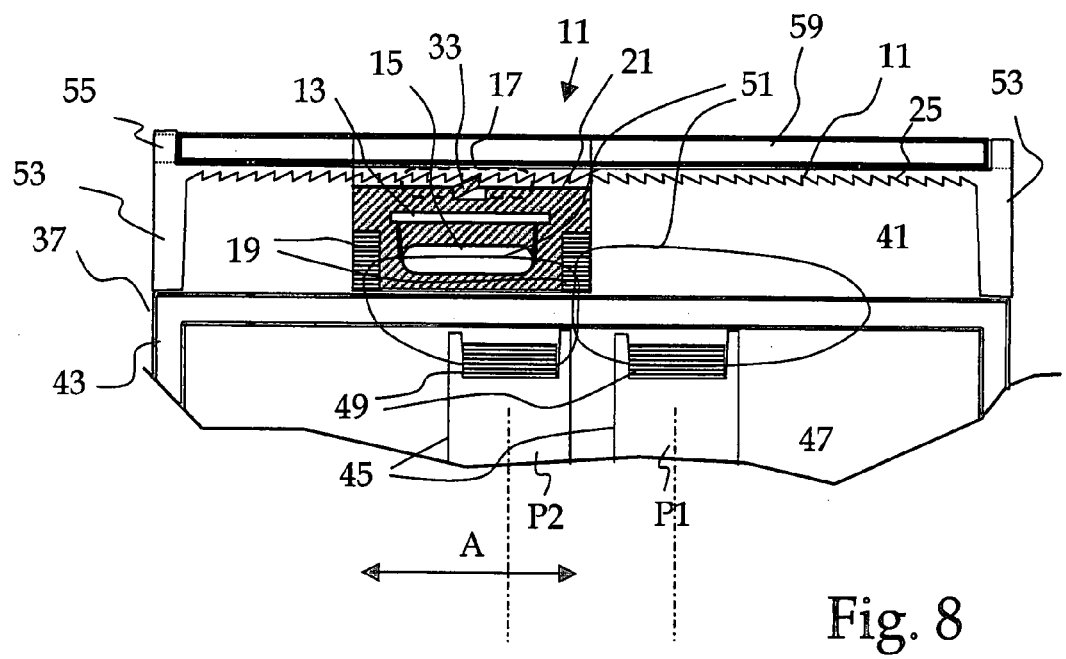
FIG. 8 shows an extract from a lengthwise section through a cylinder with a second exemplary embodiment of a sensor without a mounting tail, with the piston in a safe and in an unsafe position, one field line at a time being shown which is deformed by the shielding which is present in the sensor.

In FIG. 8 the same situations as in FIGS. 5 and 7 are shown. But the sensor is provided with two shields 19. The field lines 51 are therefore distorted in both positions of the piston 45. Therefore in the region of the sensor 11 there is a safe position A. Outside of this region the piston 45 is in an unsafe position. The transition region between these regions with the shield 19 is more precise than without this shield.

Furthermore in FIG. 8, in contrast to FIGS. 1 to 7, the sensor 11 is not made with two mounting tails 25, but with two catch mechanisms, especially two catch lips 33, for locking engagement with the teeth 35 of the fixing parts 53. These fixing parts 53 have a mounting tail 25 with teeth 35 and a stop head 55. The teeth of the mounting tail 25 engage the catch lips on the sensor body 21. Since the mounting tails which engage them can no longer be pulled back, in this way the sensor body is fixed in its position as soon as the two stop heads of the fixing parts 53 are in contact with the cylinder 43. So that the stop heads do not project over the length of the cylinder 43, the groove on its end is widened and the stop heads 55 fit into the widened groove. Advantageously the two lateral flanges 59 of the groove wall which form the undercut are cut out on their end.

The engagement can be releasable with a tool. For this purpose either the catch lip 33 can be pressed away from the mounting tail 25, or the mounting tail 25 can be raised off the catch lip 33. In the former case the catch lip 33 is elastically connected to the sensor body 21 or is made on a part which is elastically connected to the sensor body 21. In the latter case the mounting tails 25 are elastically supported against the groove 41. In any case the engagement is maintained by spring means.

Figures 9, 10:
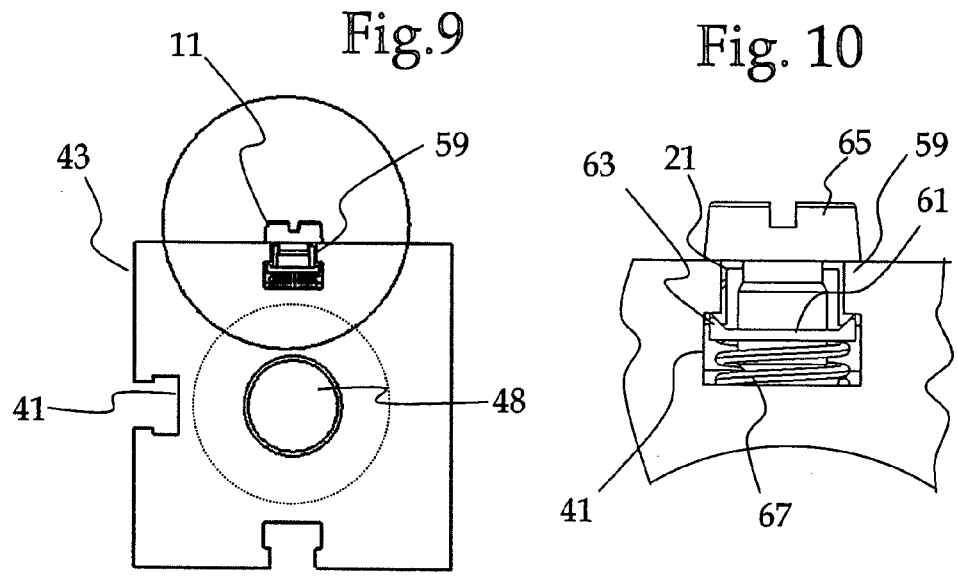
FIG. 9 shows a view of a cylinder in the direction of the cylinder axis of the sensor and the axis of motion of the piston, with a T-shaped groove and an exemplary sensor in it.
FIG. 10 shows an extract from FIG. 9 with the sensor provided with a locking means in the groove.

Another example for safe attachment of the sensor 11 in the groove 41 of a cylinder 43 is shown in FIGS. 9 and 10. On the sensor 11 a fastening disk 61 is attached which consists of a harder material than the jacket of the cylinder in which the groove 41 which has been undercut in a T-shape is made. This disk 61 is provided with a thread into which a screw 65 is screwed. On the edge or on the four corners of the disk 61 teeth 63 are formed. By tightening the screw 65 these teeth can be pressed into the material of the flange 59 which forms the undercut of the groove 41. The teeth are thus engaged with the flange 59. In this way a form-fit is established. This disk is held by a spring 67 in this engagement position. The spring 67 can, as shown, be a helical spring, or also a leaf spring. There can be resilience between the sensor with the fastening disk and the groove, or between the sensor body 21 and the fastening disk 61. By turning back the screw 65 and pressing the screw in against the spring force of the spring 67 the disk 61 can be disengaged from the groove wall so that the sensor can be moved. The sensor however is not unintentionally moved since engagement is ensured by the spring force.

Instead of the disk 61 a leaf spring can also be provided with teeth 63 and a thread and therefore can assume the function of the disk and spring at the same time. To press the teeth into the groove wall a tool which is independent of the sensor can also be used instead of the screw 65.

Figure 11:
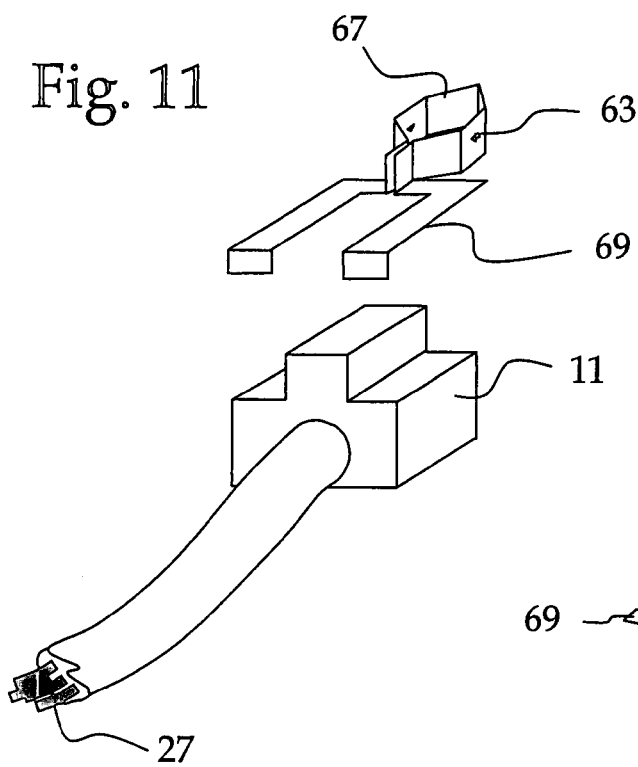
FIG. 11 shows a perspective sketch of a sensor and a spring element for attaching the sensor in a groove which has been undercut in a T-shape.

The spring element which is shown in the FIG. 11 for attaching the sensor 11 in a groove 41 which has been undercut in a T shape is produced in one piece from spring steel. It has a part which surrounds the sensor body 21 and a spring part with two teeth 63 which can be caused to engage a recess in the side wall of the groove, especially of the narrower and outer part of the T-shaped groove. These recesses can be attained by pressing a tooth 63 into the aluminum of the piston jacket.

The parts which surround the sensor body 21 in the mounted position are between the sensor body and the flange 59. They can additionally apply a spring force to the sensor which presses it against the base of the groove. The teeth 63 in the elastic part are pressed to the outside by the spring force of this part. In the relieved state of the spring element they are at a greater distance from one another than the width of the groove. In this way when the spring element is inserted into the groove with deformation of the spring parts against one another, they must be caused to approach. With a screwdriver or a special tool the teeth 63 which have been folded and punched out of spring steel can be pressed directly against one another into the aluminum of the flange 59 and therefore hold positively.

Figure 12:
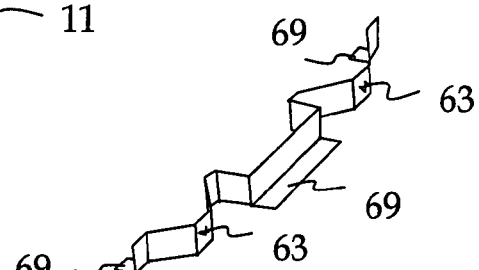
FIG. 12 shows a top view of another exemplary embodiment of such a spring element.

One version of this spring element is shown in FIG. 12. It likewise has flanges 69, a part which surrounds the sensor body and two spring parts with teeth 63. But here they are in front of and behind the sensor.

FIG. 13 shows four circuit diagrams in which the three reed contacts 15, 16, 17 are combined into two printed conductors and can have three distinguishable switching patterns. Aside from these circuit diagrams, it is also possible to tap the three reed contacts individually and to analyze the operating state of the sensor with downstream logic.

Figure 13A:
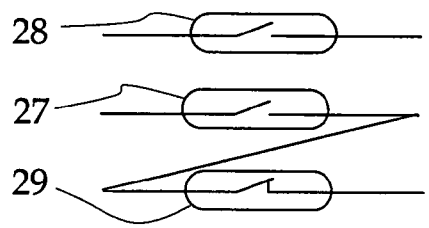
FIG. 13 shows four circuit diagrams which enable detection of the sensor state with two electrical lines.
Figure 13B:
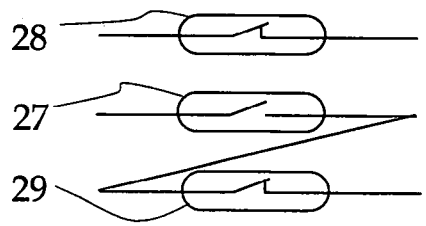

In FIGS. 13a and 13b the first reed contact 15 and the third reed contact 17 are connected in series. In the series connection it is necessary for the first reed contact to be a make contact and for the third to be a break contact in order to obtain a distinct sensor signal. The second reed contact can be a break contact (FIG. 13b) or a make contact (FIG. 13a).

Figure 13C:
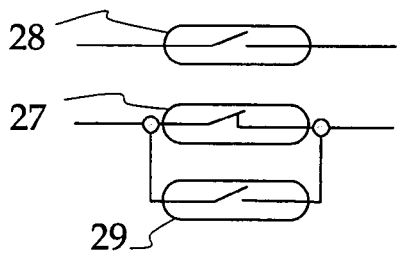
Figure 13D:
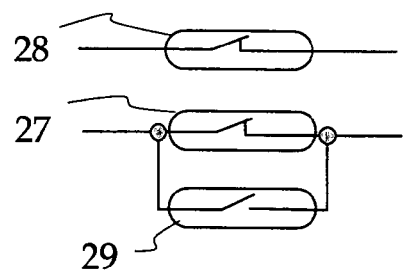

In FIGS. 13c and 13d the first reed contact 15 and the third reed contact 17 are connected in parallel. This requires that the first reed contact 15 is a break contact and the third reed contact 17 is a make contact so that distinct sensor signals are generated. The second reed contact can again be a break contact or a make contact.

The state of the reed contacts is analyzed with a logic circuit (e.g., with an electronic component). The following applies for the cited circuits:

|  | Diagram | | | | | | | |
| --- | --- | --- | --- | --- | --- | --- | --- | --- |
|  | 13a | | 13b | | 13c | | 13d | |
|  | Reed contacts | | | | | | | |
|  | 15/17 | 16 | 15/17 | 16 | 15/17 | 16 | 15/17 | 16 |
| Activated by the exciter part | 1 | 1 | 1 | 0 | 0 | 1 | 0 | 0 |
| Not activated | 0 | 0 | 0 | 1 | 1 | 0 | 1 | 1 |
| Activated by the external magnetic field | 0 | 1 | 0 | 0 | 1 | 1 | 1 | 0 |

If the reed contacts are tapped individually, each reed contact independently of one another can be a make contact or a break contact. The logic circuit can be configured accordingly such that the open position and closed position of the individual reed contacts are correctly interpreted.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Sensor for monitoring a part which can move translationally relative to the sensor with reference to a position on an axis of motion, comprising:
    a magnet which is oriented in a direction of motion with respect to a north and south pole and which is configured to be located on a movable part;
    three reed contacts which are aligned in parallel and of which the first and the second reed contacts are located in one plane and parallel next to one another with their lengthwise axes, the first and second reed contacts being positioned for actuation at approximately a same time by a magnetic field of the magnet when located on the movable part, and the third reed contact being located at a distance to the plane of the first and the second reed contacts; and
    wherein the sensor is provided with a shield located at one end of a lengthwise direction of the reed contacts and aligned perpendicular to the lengthwise direction of the reed contacts.

2. Sensor as claimed in claim 1, wherein the third reed contact is at most as sensitive as the first and second reed contacts.

3. Sensor as claimed in claim 2, wherein the sensor is provided on opposing ends with a mounting tail.

4. Sensor as claimed in claim 1, wherein there is one shield at each of two ends of each reed contact.

5. Sensor as claimed in claim 1, wherein the sensor is provided on opposing ends with a mounting tail.

6. Sensor as claimed in claim 5, comprising:
    two catch heads, the mounting tail being provided with teeth and each catch head being provided with a catch mechanism which engages the teeth, such that in interaction the catch heads are slipped on, but the catch heads are not pulled off.

7. Sensor as claimed in claim 6, wherein the catch mechanism can be released from active connection with the mounting tail by means of a tool.

8. Sensor as claimed in claim 1, in combination with a movable part, wherein the movable part is a piston in a cylinder.

9. Sensor as claimed in claim 1, wherein the shield is an iron part.

10. A cylinder comprising:
    a piston;
    a sensor for monitoring the position of the piston in the cylinder, wherein the sensor comprises:
    a magnet being oriented in a direction of motion with respect to a north and south pole and which is configured to be located on the piston;
    three reed contacts which are aligned in parallel and of which the first and the second reed contacts are located in one plane and parallel next to one another with their lengthwise axes, the first and second reed contacts being positioned for actuation at approximately a same time by a magnetic field of the magnet when located on the piston, and the third reed contact being located at a distance to the plane of the first and the second reed contacts; and wherein the sensor is provided with a shield located at one end of a lengthwise direction of the reed contacts and aligned perpendicular to the lengthwise direction of the reed contacts.

11. Cylinder as claimed in claim 10, wherein on the cylinder a groove is formed in which the sensor is supported to move in the direction of motion of the piston.

12. Cylinder as claimed in claim 11, wherein a cross section of the sensor perpendicular to its cylinder axis is made such that the sensor can be pushed into the groove in the cylinder only in a single rotary position with respect to its cylinder axis.

13. Cylinder as claimed in claim 10, wherein the sensor is made as a cylindrical part with a cylinder axis which is parallel to a lengthwise direction of the reed contacts.

14. Cylinder as claimed in claim 10, wherein the magnet is a magnetic ring formed around the piston.

* * * * *